US011522226B2

(12) United States Patent
Takenori

(10) Patent No.: US 11,522,226 B2
(45) Date of Patent: Dec. 6, 2022

(54) SOLID-STATE BATTERY

(71) Applicants: HYUNDAI MOTOR COMPANY, Seoul (KR); KIA MOTORS CORPORATION, Seoul (KR)

(72) Inventor: Hashimoto Takenori, Kanagawa (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 106 days.

(21) Appl. No.: 16/661,709

(22) Filed: Oct. 23, 2019

(65) Prior Publication Data
US 2020/0274202 A1 Aug. 27, 2020

(30) Foreign Application Priority Data

Feb. 27, 2019 (JP) .............................. JP2019-034812

(51) Int. Cl.
*H01M 10/0585* (2010.01)
*H01M 50/116* (2021.01)
(Continued)

(52) U.S. Cl.
CPC ..... *H01M 10/0585* (2013.01); *H01M 50/116* (2021.01); *H01M 50/543* (2021.01); *H01M 2004/029* (2013.01)

(58) Field of Classification Search
CPC ......... H01M 10/0585; H01M 10/0418; H01M 10/044; H01M 10/127; H01M 10/0565;
(Continued)

(56) References Cited

U.S. PATENT DOCUMENTS

2004/0253512 A1* 12/2004 Watanabe ............. H01M 4/131
429/210
2011/0183166 A1* 7/2011 Suga ................. H01M 10/0585
429/61
(Continued)

FOREIGN PATENT DOCUMENTS

JP 2008016263 A * 1/2008 ............. Y02E 60/10
JP 2009-252548 a 10/2009

OTHER PUBLICATIONS

English Translation JP 2008016263 Electric Storage Apparatus, Jan. 24, 2008, Toyota Motor Corp. (Year: 2008).*

*Primary Examiner* — Matthew T Martin
*Assistant Examiner* — Adam J Francis
(74) *Attorney, Agent, or Firm* — Morgan, Lewis & Bockius LLP

(57) ABSTRACT

A solid-state battery, in which a battery case and electrode terminals are integrally formed by resin molding, includes a solid-state battery laminate including a cathode having a cathode layer on a first current collector, an anode having an anode layer on a second current collector, a plurality of solid electrolytes located between the cathode and the anode, and a plurality of bipolar electrodes, each bipolar electrode being located between adjacent solid electrolytes and including another cathode layer and another anode layer on both surfaces of a third current collector, a cathode terminal plate, an anode terminal plate, and a resin case encapsulating the solid-state battery laminate and the cathode and anode terminal plates.

3 Claims, 8 Drawing Sheets

(51) Int. Cl.
*H01M 50/543* (2021.01)
*H01M 4/02* (2006.01)

(58) Field of Classification Search
CPC ............ H01M 50/116; H01M 50/543; H01M 2004/029; H01M 2004/8694; H01M 10/0562; H01M 50/103; H01M 50/121; H01M 50/55; H01M 50/553; H01M 50/10
See application file for complete search history.

(56) References Cited

U.S. PATENT DOCUMENTS

| | | | |
|---|---|---|---|
| 2011/0256445 A1* | 10/2011 | Kim | H01M 50/15 429/158 |
| 2016/0233478 A1* | 8/2016 | Iwasaki | H01M 50/15 |
| 2017/0309884 A1* | 10/2017 | Honda | H01M 10/0525 |
| 2018/0019459 A1* | 1/2018 | Lobert | H01M 50/528 |
| 2018/0212210 A1* | 7/2018 | Suzuki | H01M 50/54 |

* cited by examiner

SERIAL ARRANGEMENT

PARALLEL ARRANGEMENT

SOLID-STATE BATTERY

CROSS-REFERENCE TO RELATED APPLICATION

The present application claims under 35 U.S.C. § 119(a) the benefit of priority to Japanese Patent Application No. 2019-034812 filed on Feb. 27, 2019 in the Korean Intellectual Property Office, the entire contents of which are incorporated herein by reference.

TECHNICAL FIELD

The present disclosure relates to a solid-state battery. More particularly, it relates to a solid-state battery having a structure in which a battery case and electrode terminals are integrally formed by resin molding so as to improve energy density of cells.

BACKGROUND

Recently, increase in required performance of storage batteries (secondary batteries) for vehicles is being accompanied by increase in electric energy used to control vehicles and equipment for vehicles and commercialization of hybrid vehicles and/or electric vehicles. Particularly, hybrid vehicles and electric vehicles require a high battery capacity and rates occupied by a battery to the hybrid vehicles and electric vehicles are increased in terms of weight and space volume, as compared to gasoline vehicles. Therefore, miniaturization and weight reduction of storage batteries are important. Further, storage batteries are also used in power generation facilities using natural energy, such as solar photovoltaic power facilities, and, herein, miniaturization and weight reduction of storage batteries are important but not as much as in vehicles.

With such a background, solid-state batteries, such as a lithium ion battery, are being developed as storage batteries having a higher energy density. A solid-state battery is a battery which generally uses a solid electrolyte, instead of a liquid electrolyte.

However, a conventional solid-state battery (for example, Patent Document 1) is being developed as laminate cells, but causes problems, such as requiring tabs to take electrode terminals out of the cells, requiring spacers to connect the terminals when the cells are connected to be modularized, decrease in a driving distance due to decrease in volume energy density of a battery module, great interfacial resistance between a solid electrolyte and electrodes due to the solid electrolyte, requiring a pressure process (at a pressure of about 500 MPa) in manufacture of the solid-state battery.

SUMMARY

The present disclosure has been made in an effort to solve the above-described problems associated with the prior art and it is an object of the present disclosure to provide a solid-state battery having a structure in which a battery case and electrode terminals are integrally formed by resin molding so as to improve energy density of cells.

In one aspect of the present disclosure, a solid-state battery may include a solid-state battery laminate including a cathode having a cathode layer on one surface of a first current collector, an anode located opposite the cathode and having an anode layer on one surface of a second current collector facing the cathode, a plurality of solid electrolytes located between the cathode and the anode, and a plurality of bipolar electrodes, each bipolar electrode being located between adjacent solid electrolytes and having another cathode layer on one surface of a third current collector and another anode layer on another surface of the third current collector, a cathode terminal plate disposed adjacent to the cathode, an anode terminal plate disposed adjacent to the anode, and a resin case encapsulating the solid-state battery laminate, the cathode terminal plate and the anode terminal plate, wherein a resin is disposed around the solid-state battery laminate, the cathode terminal plate and the anode terminal plate.

In a preferred embodiment, a portion of the cathode terminal plate and a portion of the anode terminal plate may extend to have greater lengths than a length of the solid-state battery laminate. The cathode terminal plate and the anode terminal plate each may have a terminal end bent toward the solid-state battery laminate and a terminal block may cover each terminal end and may be formed integrally with the resin case.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
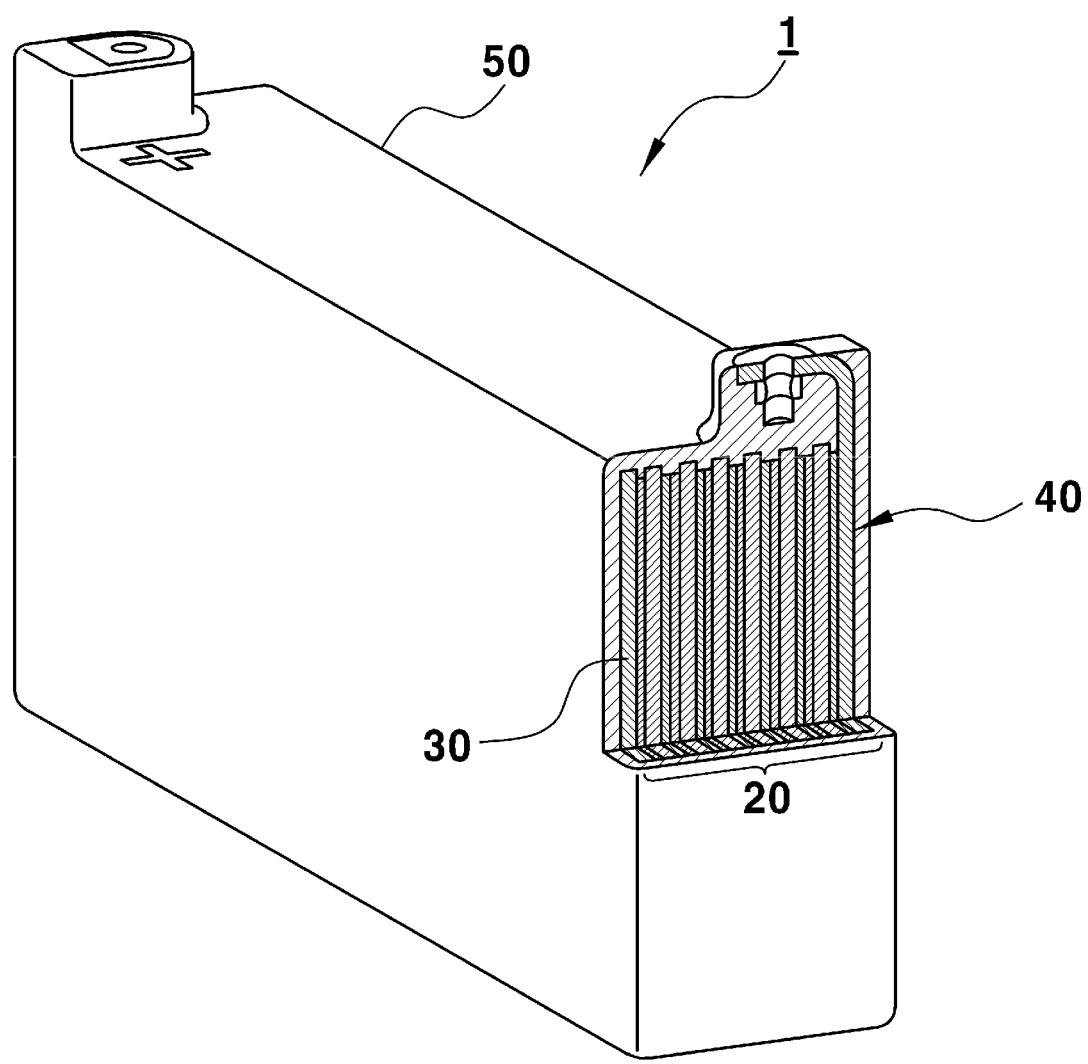
FIG. 1 is a perspective view of a battery module of a solid-state battery according to one aspect of the present disclosure, partially cut out to show the internal structure of the solid-state battery.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the present disclosure will be described in conjunction with exemplary embodiments, it will be understood that the present description is not intended to be limited to the exemplary embodiments. On the contrary, the present disclosure is intended to cover not only the exemplary embodiments, but also various alternatives, modifications, equivalents and other embodiments within the spirit and scope of the disclosure as defined by the appended claims.

Hereinafter, a module structure of a solid-state battery and a battery module using the same according to various aspects of the present disclosure will be described in detail with reference to the accompanying drawings. FIG. 1 is a perspective view of a module structure of a solid-state battery according to one exemplary embodiment of the present disclosure, partially cut out to show the internal structure of the solid-state battery.

Referring to FIG. 1, the module structure 1 of the solid-state battery includes a solid-state battery laminate 20 which is charged and discharged, a cathode terminal plate 30, and an anode terminal plate 40. The cathode and anode terminal plates 30 and 40 are located on both surfaces of the solid-state battery laminate 20 such that the solid-state battery laminate 20 is interposed between the cathode terminal plate 30 and the anode terminal plate 40. The module structure 1 of the solid-state battery further includes a resin case 50 covering the outer surfaces of the solid-state battery laminate 20, the cathode terminal plate 30 and the anode terminal plate 40 to integrate the solid-state battery laminate 20, the cathode terminal plate 30 and the anode terminal plate 40.

Figure 2:
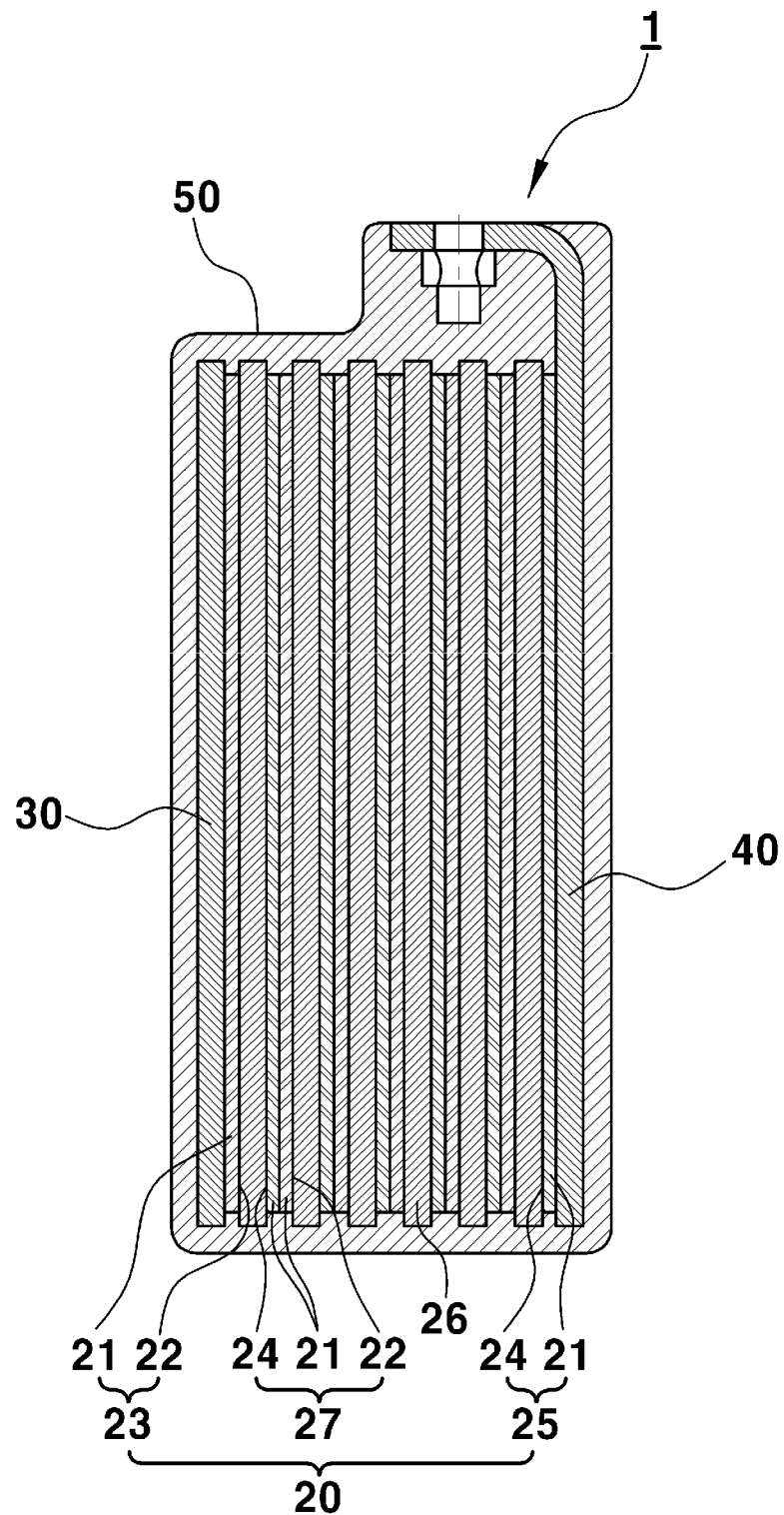
FIG. 2 is a longitudinal-sectional view schematically illustrating the internal structure of the solid-state battery of FIG. 1.

FIG. 2 is a longitudinal-sectional view schematically illustrating the internal structure of the solid-state battery of FIG. 1. Referring to FIG. 2, the solid-state battery laminate 20 includes a cathode 23 prepared by forming a cathode layer 22 on one surface of a current collector 21, and an anode 25 located opposite the cathode 23 and prepared by forming an anode layer 24 on one surface of a current collector 21 facing the cathode layer 22. The solid-state battery laminate 20 further includes a plurality of solid electrolytes 26 located between the cathode 23 and the anode 25, and a plurality of bipolar electrodes 27, each of which is located between the adjacent solid electrolytes 26 and prepared by forming a cathode layer 22 on one surface of a current collector 21 and forming an anode layer 24 on the other surface of the current collector 21.

The solid-state battery laminate 20 is formed by stacking a plurality of layers, as described above, but, in part, is configured such that a plurality of minimum unit structures (unit cells) of the solid-state battery, each of which includes the cathode layer 22, the solid electrolyte 26 and the anode layer 24 stacked in order, is arranged in series. Here, kinds and organizations of materials used in the solid-state battery laminate 20 are not limited, as long as they may function as solid-state batteries. The respective layers of the solid-state battery laminate 20 use known materials which will be described below.

According to one aspect of the present disclosure, the current collector 21 may employ a metal foil, and the metal foil may be formed of a material, such as Al, SUS, Cu, Ni or the like. Although there may be three kinds of electrodes, i.e., the cathode 23, the anode 25 and the bipolar electrode 27, of the solid-state battery laminate 20 respectively include the current collectors 21, the current collectors 21 of the three kinds of electrodes 23, 25 and 27 may be formed of the same material or different materials.

The cathode layer 22 may include a cathode active material, and the cathode active material may be $LiCoO_2$, $LiMnO_2$, $LiMn_2O_4$, $LiFePO_4$, $LiMnPO_4$ or the like. Although the cathode 23 and the bipolar electrode 27 respectively include the cathode layers 22, the cathode layers 22 of the cathode 23 and the bipolar electrode 27 may include the same cathode active material.

The anode layer 24 may include an anode active material, and the anode active material may be a carbon material, such as graphite, hard carbon or soft carbon, or an inorganic oxide, such as $Li_4Ti_5O_{12}$. Although the anode 25 and the bipolar electrode 27 respectively include the anode layers 24, the anode layers 24 of the anode 25 and the bipolar electrode 27 may include the same anode active material.

The solid electrolyte 26 may employ an oxide-based solid electrolyte or a sulfide-based solid electrolyte, the oxide-based solid electrolyte may be $Li_{1.5}Al_{0.5}Ti_{1.5}(PO_4)_3$, $Li_{0.5}La_{0.5}TiO_3$ or the like, and the sulfide-based solid electrolyte may be $Li_2S-P_2S_5$, $Li_2S-SiS_2$, $LiGe_{0.25}P_{0.75}S_4$ or the like.

Figure 3A:
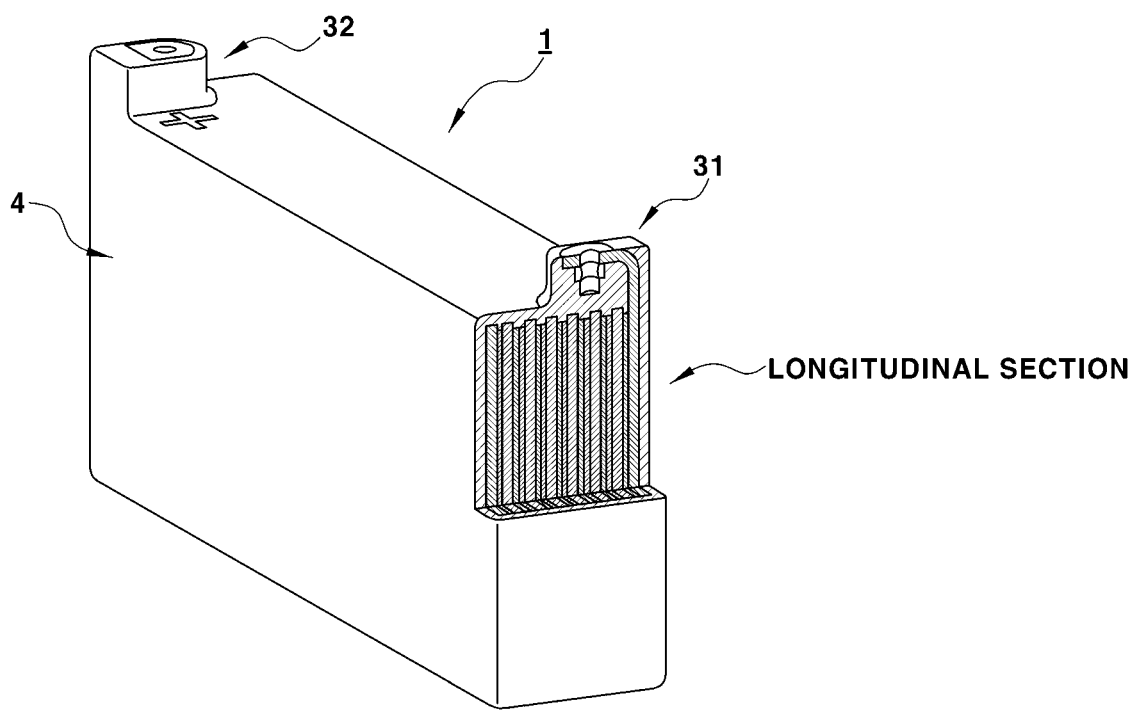
FIGS. 3A and 3B are perspective and longitudinal-sectional views of a battery module having nut-type electrode terminals according to one aspect of the present disclosure, partially cut out to show the inside of the battery module.
Figure 3B:
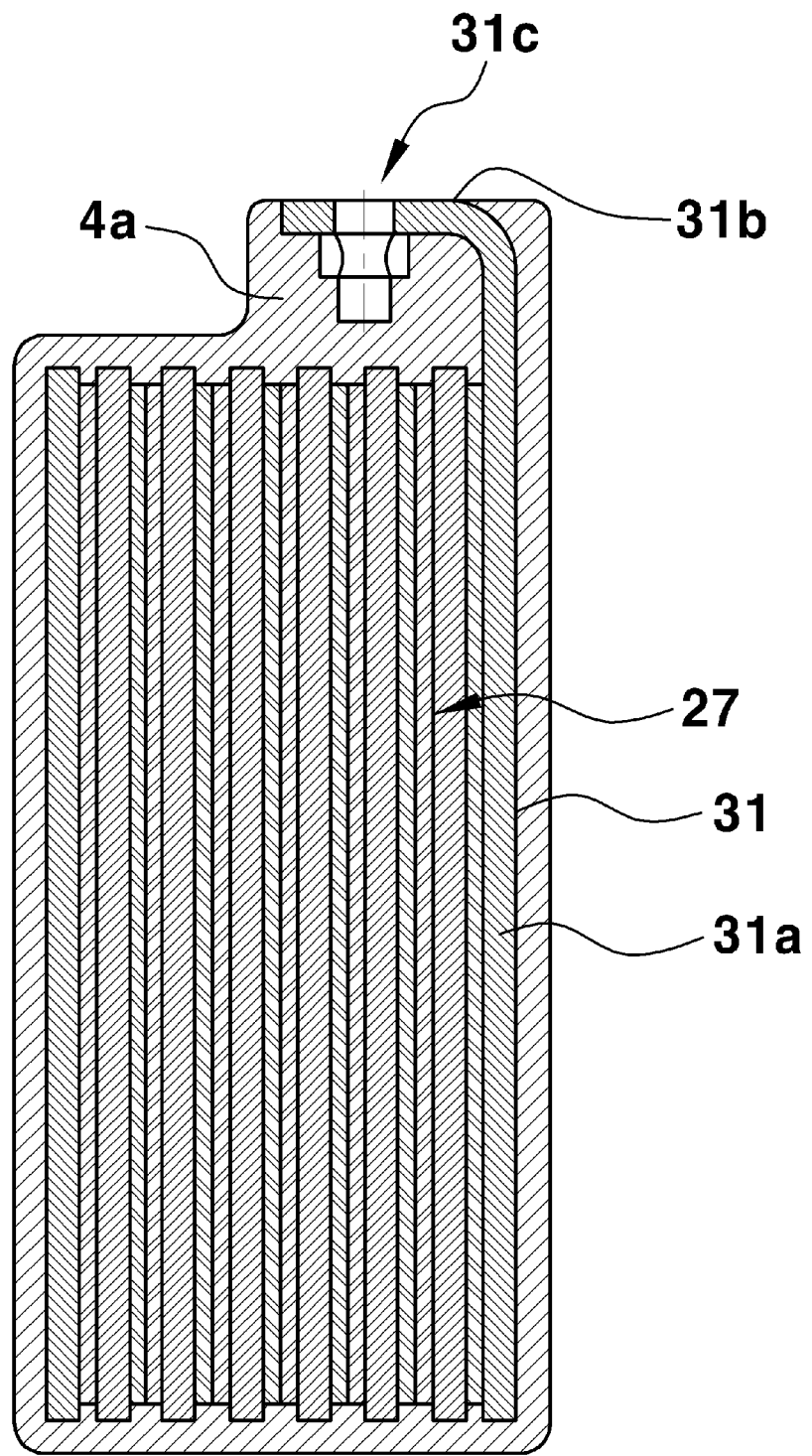

FIGS. 3A and 3B illustrate a battery module 1 manufactured according to one aspect of the present disclosure. Six unit cells electrically connected in series by bipolar electrodes 27 may be received in a resin case 4. Here, the respective unit cells may be lithium ion batteries. The present disclosure may be applied to other solid-state batteries.

The bipolar electrode 27 may be a plate-type electrode which is provided between adjacent unit cells and thus serves as a cathode in one unit cell and as an anode in the other unit cell. Through such a bipolar structure, i.e., a structure using the bipolar electrodes 27, a plurality of unit cells may be electrically connected in series. The bipolar structure may lower electric resistance between the unit cells and compact the battery module 1 and the entirety of the solid-state battery. The cathode 23, the bipolar electrodes 27 and the anode 25 may be separately manufactured and then stacked, as described above, or one bipolar plate may be used to serve as both a cathode and an anode. In this case, the bipolar electrode 27 requires a material which is not concerned with chemical reaction for charge/discharge of the battery and has low resistance, and thus uses a carbon plate, a titanium plate or the like.

The battery module 1 is manufactured by pressurizing a laminate of six unit cells placed within an injection molding apparatus, performing injection molding of the laminate by injecting a molten resin acquired by heating resin pellets (powder) into a mold set at a pressure of 100 MPa, and curing the resin. Thereby, the battery module 1 in which the unit cells are surrounded by the resin case 4 is manufactured.

In the resin case 4, as shown in FIGS. 3A, 3B, 4A, 4B, 5 and 6 according to some aspects of the present disclosure, a terminal block 4a for a cathode terminal 32 and a terminal block 4a for an anode terminal 31 are installed on the upper surface of the battery module 1 corresponding to the side surfaces of the unit cells, and the cathode terminal 32 and the anode terminal 31 are respectively installed in the corresponding terminal blocks 4a.

The cathode terminal 32 has a cathode terminal plate (not shown) disposed adjacent to the cathode 23, and the anode terminal 31 has an anode terminal plate 31a disposed adjacent to the anode 25. A portion of the cathode terminal plate and a portion of the anode terminal plate 31a extend to have greater lengths than the solid-state battery laminate 20, and the cathode terminal 32 and the anode terminal 31 each have a terminal end 31b, which is bent toward the solid-state battery laminate 20.

The resin case 4 is formed by inserting the solid-state battery laminate 20, the cathode terminal plate and the anode terminal plate 31a in a stacked state into a mold set, injecting a molten resin into the mold set at a high pressure of 100 MPa and curing the resin. Thereby, the resin case 4 encapsulates the solid-state battery laminate 20, the cathode terminal plate and the anode terminal plate 31a. By performing such injection molding by applying a high pressure, interfacial resistance of the solid-state battery may be reduced.

Figure 4A:
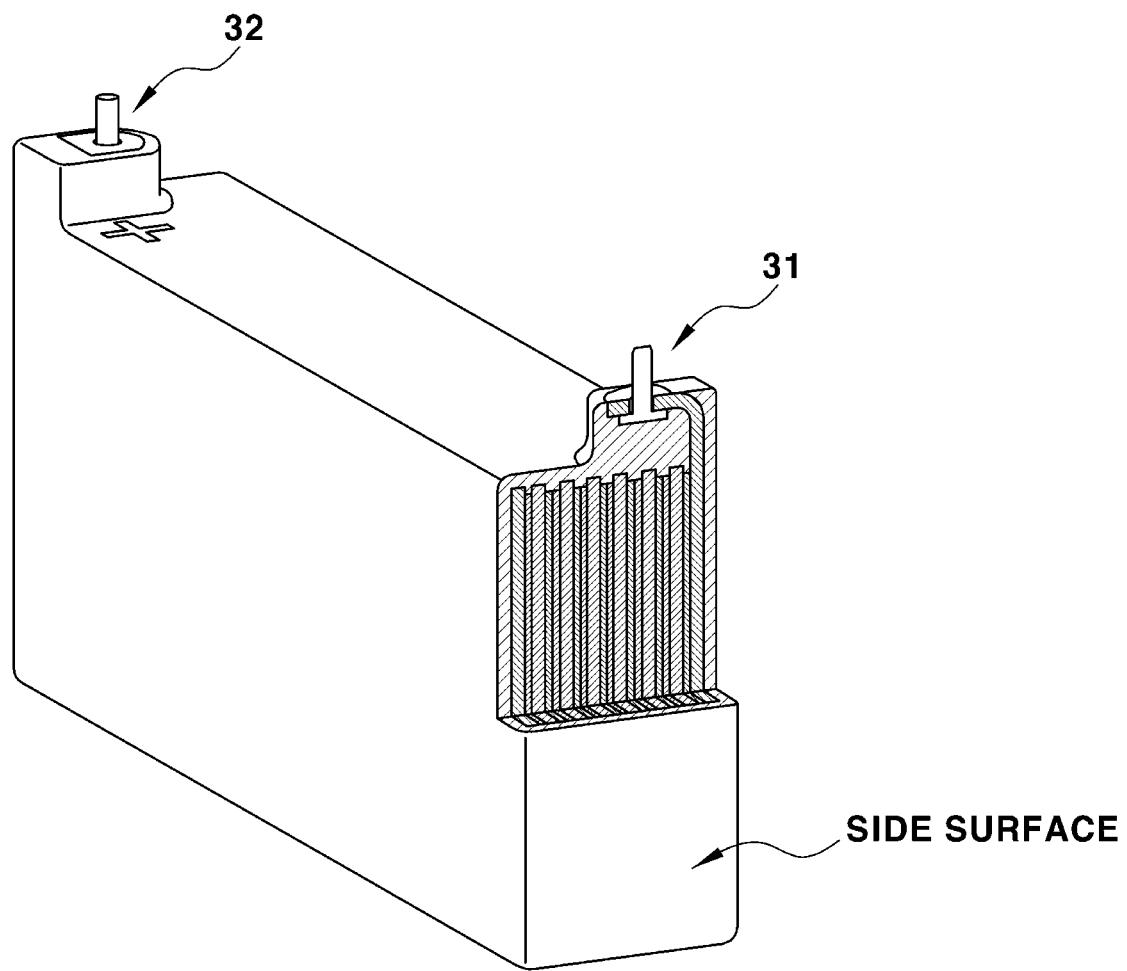
FIGS. 4A and 4B are perspective and longitudinal-sectional views of a battery module having bolt-type electrode terminals according to one aspect of the present disclosure, partially cut out to show the inside of the battery module.
Figure 4B:
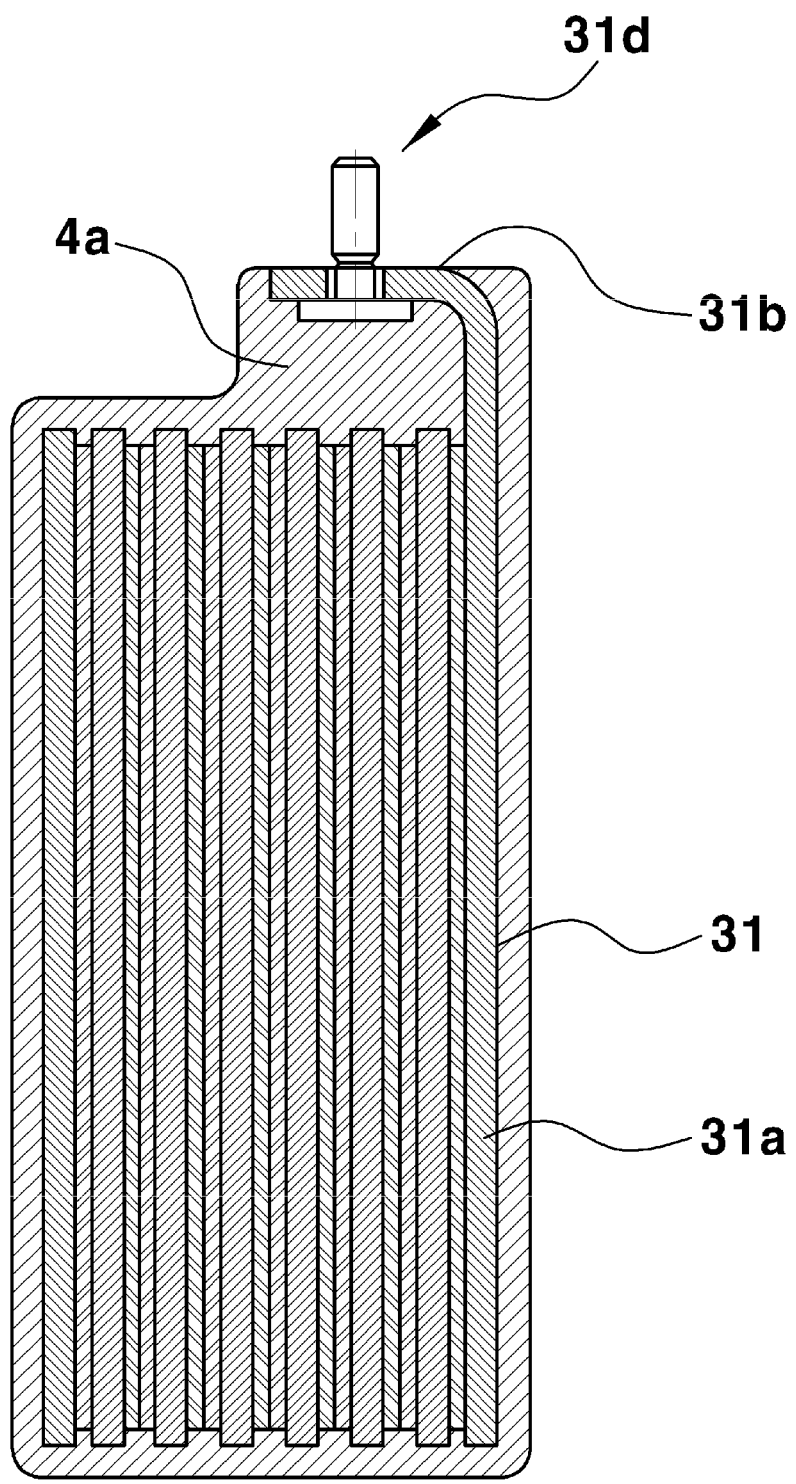

According to one exemplary embodiment of the present disclosure, the resin case 4 includes the terminal blocks 4a to cover the bent terminal end of the cathode terminal plate and the bent terminal end 31b of the anode terminal plate 31a, as shown in FIGS. 3A and 3B and FIGS. 4A and 4B. The terminal blocks 4a are formed to protrude from the outer surface of the resin case 4. Such terminal blocks 4a may be used as reference points for electrical connection of the solid-state battery. FIGS. 3A and 3B illustrate a terminal block 4a for nut-type connection, and a nut-type terminal 31c is mounted on the terminal end 31b according to one exemplary embodiment of the present disclosure. The terminal block 4a may be a reference point for connection of the nut-type terminal 31c. FIGS. 4A and 4B illustrate a terminal block 4a for bolt-type connection, and a bolt-type terminal 31d is mounted on the terminal end 31b according to one exemplary embodiment of the present disclosure. The terminal block 4a may be a reference point for connection of the bolt-type terminal 31d.

Figure 5:
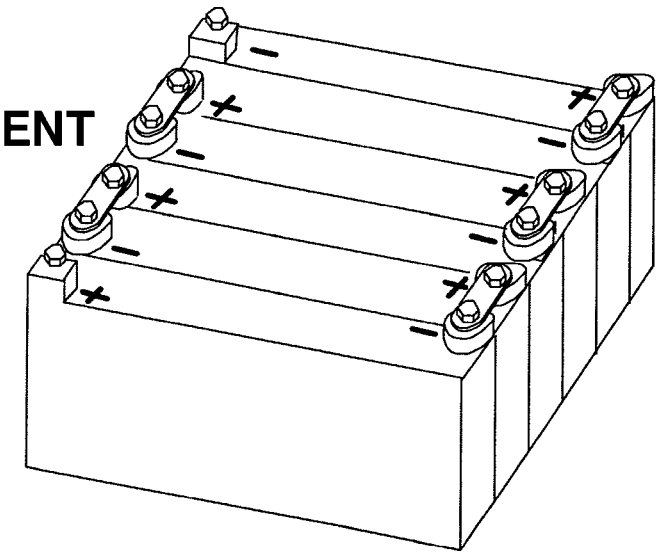
FIG. 5 is a view illustrating series connection of battery modules according to one aspect of the present disclosure.
Figure 6:
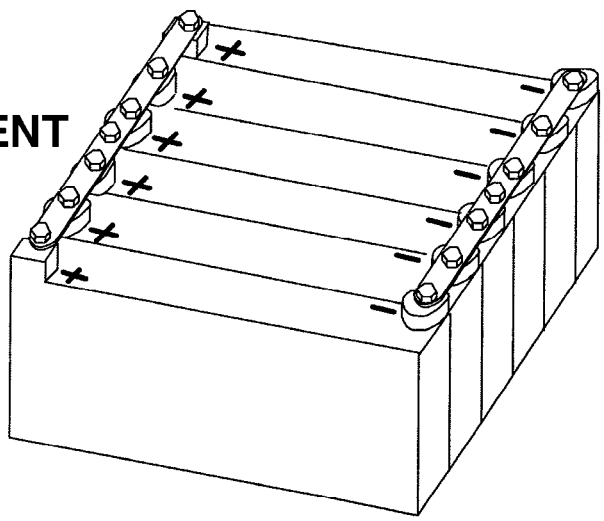
FIG. 6 is a view illustrating parallel connection of battery modules according to one aspect of the present disclosure.

FIG. 5 illustrates a solid-stage battery formed by connecting six battery above-described modules according to one exemplary embodiment of the present disclosure. In this case, the six battery modules are electrically connected in series. Further, FIG. 6 illustrates a battery formed by connecting six battery modules in parallel according to one exemplary embodiment of the present disclosure. In any case, since electrode terminals provided on the upper surface of the battery module are located close to electrode terminals of the adjacent battery modules, a space for connection may be small, workability may be improved and electrical resistance may be reduced.

Further, if the solid-state battery is formed by collecting a plurality of battery modules, as exemplarily shown in FIGS. 5 and 6, heat dissipation may be improved by inserting a material having a high heat transfer property between the battery modules.

Figure 7:
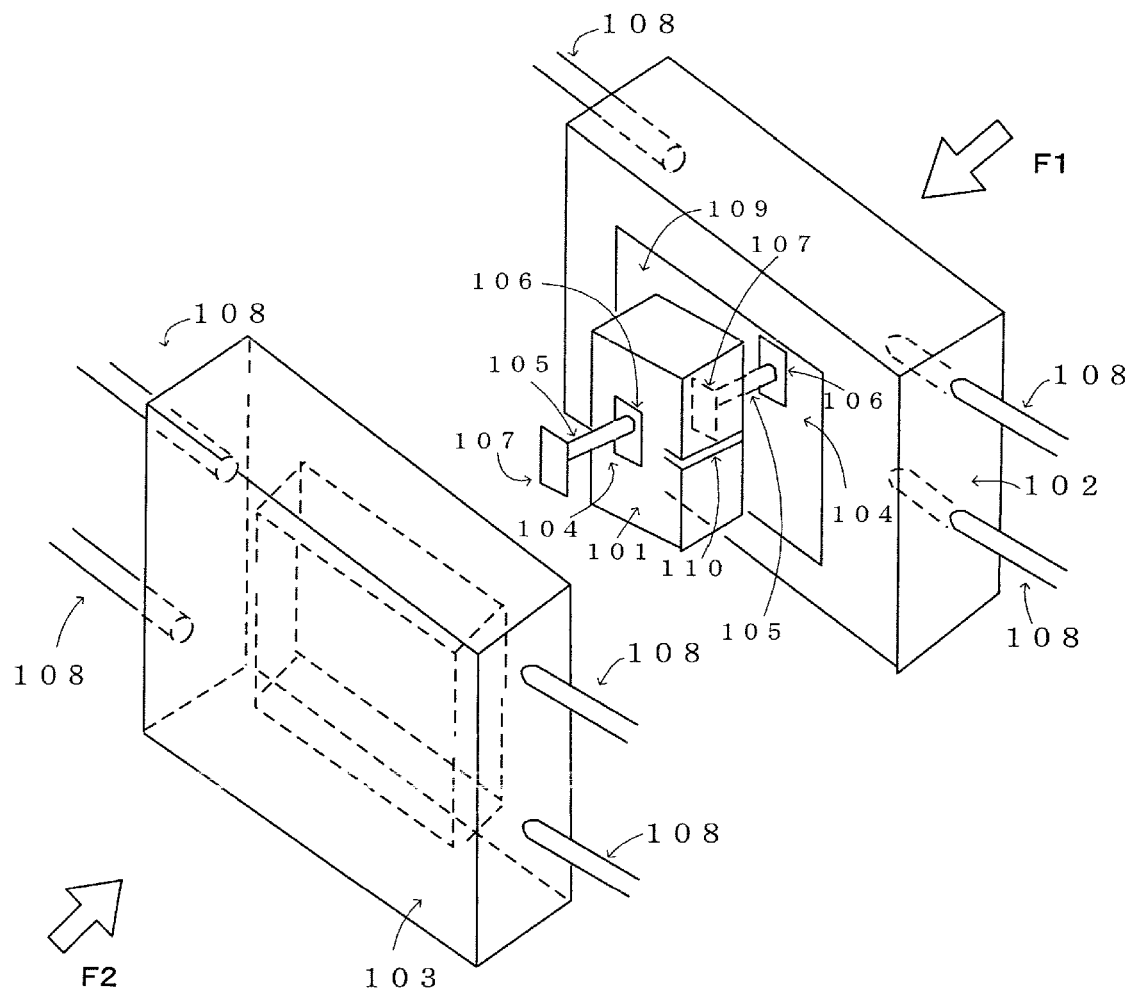
FIG. 7 is a schematic view illustrating formation of a resin case on a battery module in accordance with the present disclosure by molding using a mold set.

FIG. 7 illustrates formation of a resin case on a battery module according to one aspect of the present disclosure by molding using a mold set. A cell stack 101, in which a plurality of layers is stacked through a bipolar structure, is inserted into two molds, i.e., right and lefts molds 102 and 103. Pressing tools 104 are respectively provided between the cell stack 101 and the right mold 102 and between the cell stack 101 and the left mold 103. Each of the pressing tools 104 includes a push bolt 105, a plate 106 connected to one end of the push bolt 105 facing the cell stack 101 and a plate 107 connected to the other end of the push bolt 105 facing the corresponding mold 102 or 103. A screw thread is formed on the outer circumferential surface of the push bolt 105, and through holes into which the push bolt 105 is inserted are formed through the plates 106 and 107. Internal threads engaged with the thread of the push bolt 105 are formed on the inner circumferential surfaces of the through holes. The plates 106 and 107 are connected to the push bolt 105 by engaging the internal threads of the plates 106 and 107 with the screw thread of the push bolt 105.

A distance from the plate 106 to the plate 107, i.e., a length of the pressing tool 104, is adjusted by turning the push bolt 105. Until an injection molding process is started, i.e., until the molds 102 and 103 are closed, the pressing tools 104 are in a free state, i.e., in a state in which pressing force is not applied. When the injection molding process is started, i.e., the right and left molds 102 and 103 are closed, the pressing tools 104 contact both the cell stack 101 and recess parts 109 of the molds 102 and 103 and are pressurized. Therefore, the plates 106 of the pressing tools 104 facing the cell stack 101 press the cell stack 101 from both sides during injection molding, and thus prevent a resin for molding from entering into the cell stack 101.

Materials of the push bolt 105 and the plates 106 and 107 may include a resin having similar properties to the resin to form the case receiving the cell stack 101 by injection molding, but a resin which has slightly higher thermoplasticity and a slightly higher melting point than the resin to form the case by injection molding is used. After injection molding, the pressing tools 104 remain in the case as parts of the case.

When the cell stack 101 and the pressing tools 104 are installed in the left and right molds 102 and 103, both the molds 102 and 103 are set. That is, the molds 102 and 103 are closed. Thereafter, the molten resin acquired by heating resin pellets using a heater (not shown) is injected into the molds 102 and 103 from resin injection molding pipes 108. Although FIG. 7 illustrates that the resin injection molding pipe 108 is installed at each of four corners of each of the right and left molds 102 and 103, i.e., a total of eight resin injection molding pipes 108 is installed, the number and positions of the resin injection molding pipes 108 may be determined in consideration of fluidity of the resin by the size and shape of the cell stack 101 or the material of the injected resin.

The right and left molds 102 and 103 are precisely machined so that the two molds 102 and 103 are fastened to each other by interference fit and thus the injected resin is not leaked, but forces F1 and F2 are applied to both the molds 102 and 103 so as to withstand the pressure of the injected resin during injection molding. If one mold is fixed, only the remaining mold may be operated and force is applied only to the remaining mold. When the resin is cured, the molds 102 and 103 are opened, and the battery module provided with the case formed of the resin is taken out of the molds 102 and 103.

As the resin used in injection molding to form the case of the battery module, any resin which has sufficient strength, thermal resistance and corrosion resistance may be used, and, for example, polycarbonate is one of suitable materials.

According to one exemplary embodiment of the present disclosure, FIG. 7 illustrates injection molding being performed after a fastening member 110 is attached to the cell stack 101. The fastening member 110 is a band-type member which is wound on the cell stack 101, and remains in the case. The fastening member 110 may suppress expansion of the cell stack 101 during use of the battery.

As is apparent from the above description, in a solid-state battery in which a battery case and electrode terminals are integrally formed by resin molding according to one aspect of the present disclosure, when cells are connected for modularization or formation of a battery pack, bolt coupling is possible, and thus, reliability of the solid-state battery to external impact, such as vibration, may be improved. Further, when a specific cell breaks down, replacement thereof may be simply carried out. Moreover, pressure is uniformly applied to electrodes, and thus, interfacial resistance of the solid-state battery may be reduced. In addition, connection of the cells is simplified, and thus, reliability in connection may be improved. Further, connection of the cells is simplified, and thus, a space for connection may be reduced. Furthermore, the cells are mechanically connected, and thus, expansion of the cells may be suppressed during charging and discharging.

The present disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A solid-state battery comprising:
    a solid-state battery laminate comprising:
    a cathode including a cathode layer on one surface of a first current collector;
    an anode located opposite the cathode and including an anode layer on one surface of a second current collector facing the cathode;
    a plurality of solid electrolytes located between the cathode and the anode; and
    a plurality of bipolar electrodes, each bipolar electrode being located between adjacent solid electrolytes and including another cathode layer on one surface of a third current collector and another anode layer on another surface of the third current collector;
    a cathode terminal plate disposed adjacent to the cathode;
    an anode terminal plate disposed adjacent to the anode; and
    a resin case encapsulating the solid-state battery laminate, the cathode terminal plate and the anode terminal plate,
    wherein the resin case includes terminal blocks respectively receiving a terminal end of the cathode terminal plate and a terminal end of the anode terminal plate, and the terminal blocks are formed to protrude from an outer surface of the resin case and configured as reference points for electrical connection of the solid-state battery,
    wherein each of the cathode terminal plate and the anode terminal plate includes an extending portion extending to have greater lengths than a length of the solid-state battery laminate,
    wherein each of the extended portions of the cathode and anode terminal plates has a bent portion that is bent toward the solid-state battery laminate, each bent portion having a through-hole formed therein, and
    wherein a nut-type terminal or a bolt-type terminal is mounted on each of the bent portions of the cathode and anode terminal plates, wherein the terminal blocks are configured as a reference point for connection of the nut-type terminal or the bolt-type terminal.

2. The solid-state battery of claim 1, wherein the terminal blocks are formed integrally with the resin case.

3. A solid-state battery comprising:
    a solid-state battery laminate comprising:
    a cathode including a cathode layer on one surface of a first current collector;
    an anode located opposite the cathode and including an anode layer on one surface of a second current collector facing the cathode;
    a plurality of solid electrolytes located between the cathode and the anode; and
    a plurality of bipolar electrodes, each bipolar electrode being located between adjacent solid electrolytes and including another cathode layer on one surface of a third current collector and another anode layer on another surface of the third current collector;
    a cathode terminal plate disposed adjacent to the cathode;
    an anode terminal plate disposed adjacent to the anode; and
    a resin case encapsulating the solid-state battery laminate, the cathode terminal plate and the anode terminal plate,
    wherein the resin case includes terminal blocks respectively receiving a terminal end of the cathode terminal plate and a terminal end of the anode terminal plate, and the terminal blocks are formed to protrude from an outer surface of the resin case and configured as reference points for electrical connection of the solid-state battery,
    wherein each of the cathode terminal plate and the anode terminal plate includes an extended portion extending to have greater lengths than a length of the solid-state battery laminate,
    wherein each of the extended portions of the cathode and anode terminal plates has a bent portion that is bent toward the solid-state battery laminate,
    wherein one surface of each bent portion is exposed from a corresponding one of the terminal blocks of the resin case, and
    wherein a nut-type terminal or a bolt-type terminal is mounted on each of the bent portions of the cathode and anode terminal plates, wherein the terminal blocks are configured as a reference point for connection of the nut-type terminal or the bolt-type terminal.

\* \* \* \* \*